United States Patent

Lavallee et al.

[11] Patent Number: 5,122,046
[45] Date of Patent: Jun. 16, 1992

[54] GOLF BALL INJECTION MOLD

[75] Inventors: Gerald A. Lavallee, Belchertown; Mario R. Jarmuzewski, Chicopee, both of Mass.

[73] Assignee: Lisco, Inc., Tampa, Fla.

[21] Appl. No.: 690,438

[22] Filed: Apr. 24, 1991

Related U.S. Application Data

[63] Continuation-in-part of Ser. No. 543,514, Jun. 26, 1990, abandoned.

[51] Int. Cl.$^5$ .............................................. B29C 45/27
[52] U.S. Cl. ..................... 425/116; 264/278; 425/468; 425/577
[58] Field of Search ............... 425/116, 119, 468, 577, 425/572, 573, 588; 264/278

[56] References Cited

U.S. PATENT DOCUMENTS

| | | | |
|---|---|---|---|
| 2,017,216 | 10/1935 | Marcus | 425/116 |
| 2,076,412 | 4/1937 | Oldham | 425/468 |
| 2,361,348 | 10/1944 | Dickson et al. | 425/468 |
| 2,376,085 | 5/1945 | Radford et al. | 425/468 |
| 3,288,469 | 11/1966 | Shaw | 273/199 |
| 3,672,807 | 6/1972 | Genz | 425/422 |
| 3,933,967 | 1/1976 | Taylor | 425/519 |
| 3,996,330 | 12/1976 | Jones et al. | 264/328 |
| 4,377,548 | 3/1983 | Pierpont | 264/278 |
| 4,734,027 | 3/1988 | Adams | 425/556 |
| 4,741,507 | 5/1988 | Baird | 425/116 |
| 4,959,000 | 9/1990 | Giza | 425/116 |
| 5,022,152 | 6/1991 | Tai | 264/278 |

FOREIGN PATENT DOCUMENTS 460388 11/1950 Italy ............... 264/278

Primary Examiner—David A. Simmons
Assistant Examiner—W. Jackson Matney, Jr.
Attorney, Agent, or Firm—Donald R. Bahr; John E. Benoit

[57] ABSTRACT

An injection mold for producing a two-piece golf ball includes first and second cavities having mating hemispherical inner surfaces with retractable pins for supporting a solid core within the cavities spaced from the inner hemispherical surface. A runner system is provided in the mold for distributing flowable plastic material. A plurality of tunnel gates substantially equally spaced about the perimeter in one of the sections interconnect the inner hemispherical surfaces to the runner system with the tunnel gates being vertically offset from the parting line surface of the two sections. The pins support the solid core in its premolding condition such that the center of the core is slightly offset from the centerline of the mold in the direction of the inner hemispherical surface of the cavity containing the tunnel gates.

6 Claims, 2 Drawing Sheets

GOLF BALL INJECTION MOLD

This application is a continuation-in-part of U.S. patent application Ser. No. 07/543,514 filed Jun. 26, 1990, now abandoned.

This invention relates generally to injection-molding of two-piece golf balls, and more specifically to sub-gated injection-molding of such two-piece golf balls.

It is standard practice in injection-molding two-piece golf balls to provide a mold having two cavities, each having hemispherical surfaces, which mate when the mold is joined. A solid core is supported centrally within the mold by retractable pins or the like so as to leave a space for molding a cover about the solid core.

A runner is provided within the mold so as to provide a supply of the thermoplastic material which is to be injected to produce the cover. This runner usually exists about the parting line of the mold halves with gates being connected to the runner and extending to the inner hemispherical surfaces.

While the above process is satisfactory, it does result in a substantial flash line about the equator of the ball and gate vestige along the flash line corresponding to the number of gates used in supplying the thermoplastic material. Accordingly, the ball as it is removed from the mold requires post molding degating, trimming, or centerless grinding in order to produce a smooth, basically finished ball.

The present invention provides a mold which produces a two-piece golf ball which, when removed from the mold, does not have any gate vestige and has only a minimal flash line on the ball. This provides a ball which does not require post-molding degating, trimming, or centerless grinding so as to reduce the finishing process to brush tumbling. Such a result, as well as other advantages, will become apparent from the following description taken together with the drawings.

SUMMARY OF THE INVENTION

An injection mold is disclosed for producing two-piece golf balls with the mold comprising first and second cavities having hemispherical surfaces which mate when cavities are joined. Retractable pins in each of the sections are provided for supporting a solid core of a golf ball within the hemispherical surfaces when the cavities are so mated. The cavities are removably supported by a plate which comprises the rest of the mold structure. A runner is provided in the plate and first and second cavities which extends about the cavity sections. A plurality of tunnel gates extend from the inner wall of one of the hemispherical surfaces and are connected to the runner, with the tunnel gates being vertically offset from the parting line of the mold. The parting line clearance is reduced to substantially zero, wherein when the ball is removed from the mold the gate vestige breaks away from the ball surface and the zero clearance of the parting line substantially eliminates the flash line on the ball. It is preferable that the retractable pins in the cavity section which includes the tunnel gates extend beyond the hemispherical surface a slightly shorter distance than the retractable pins in the other cavity section.

DETAILED DESCRIPTION OF THE PREFERRED EMBODIMENT

Figure 1:
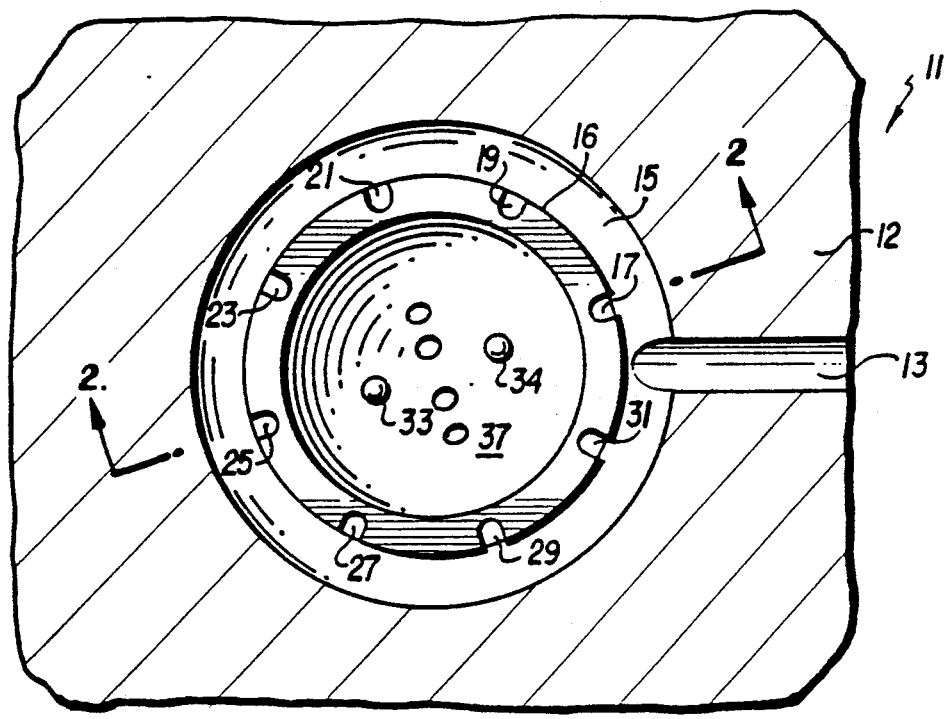
FIG. 1 is a partial plan view of one section of the mold having one cavity section therein.

Turning now to FIG. 1, there is shown a section of mold half 11 for producing a single golf ball. The mold half comprises cavity 16 and support plate 12. It is to be understood that standard molds have a plurality of such cavities so that in a single molding step a plurality of balls are produced.

Support plate 12 is provided with a runner which includes entrance channel 13 and circumferential channel 15. The half of the mold shown in FIG. 1 is normally the lower half of the total mold with the two halves, upper and lower, being shown mated in FIG. 2.

Cavity 16 is supported by plate 12 and provides interior hemispherical surface 37. A plurality of grooves 17, 19, 21, 23, 25, 27, 29, and 31 are cut into the upper surface of cavity 16 and extend into along the surface for a distance which stops short of hemispherical surface 37.

Figure 2:
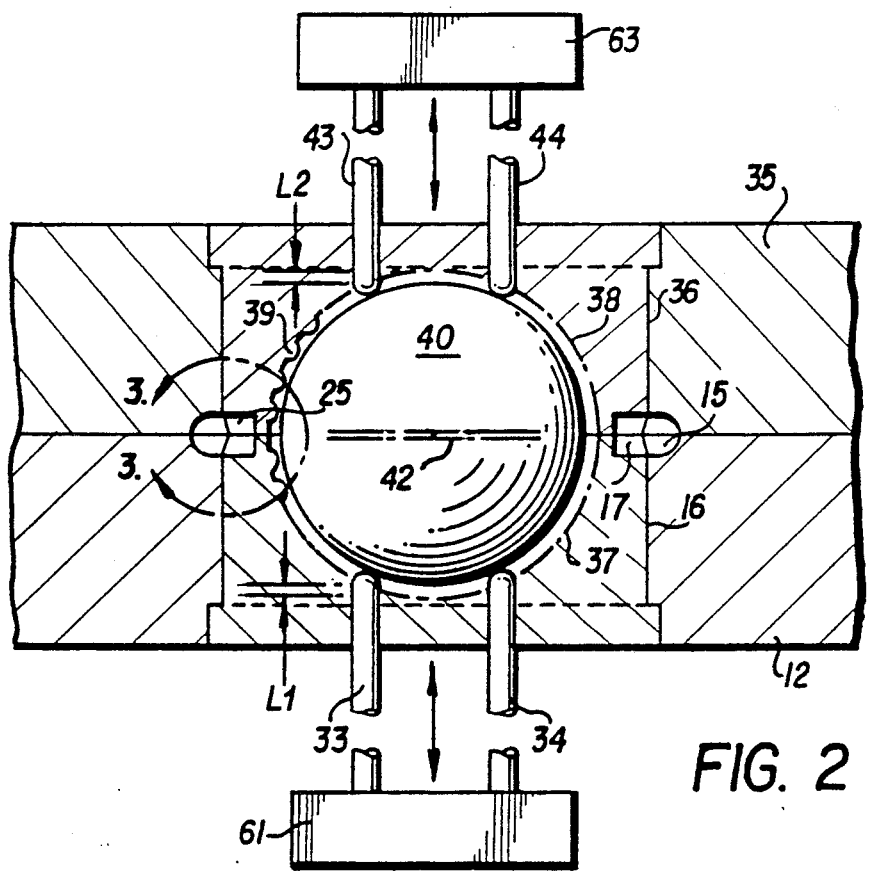
FIG. 2 is a sectional view taken along the lines 2—2 of FIG. 1 and includes the other mold and cavity.

FIG. 2 illustrates the entire mold having upper plate 35 of the mold in place on lower plate 12. As can be seen, upper plate 35 includes mating channels so as to complete runner 15 to provide a free flow of the thermoplastic material. Upper plate 35 supports cavity 36 which includes mating grooves so as to complete grooves 17–25 of cavity 16. Upper mold plate 35 supports cavity 36, which mates with cavity 16 to form an interior spherical surface which includes hemispherical surfaces 37 and 38. The cavity surfaces include protuberances 39, which form the dimples in the cover of the ball.

Solid core 40 is shown as being held in a substantially central position within the spherical cavity by retractable pins 33, 34, 43, and 44. Retractable pins 33, 34, 43, and 44 extend through the cavities beyond the hemispherical surfaces so as to support core 40 within the mold. Pins 33 and 34 preferably extend beyond hemispherical surface 37 a distance different from pins 43 and 44 for reasons which will be discussed below. Positioning and movement of pins 33 and 34 are controlled by programmed mechanism 61 while the positioning and movement of pins 43 and 44 is controlled by programmed mechanism 63. The timing of the entire mold operation is coordinated.

Figure 3:
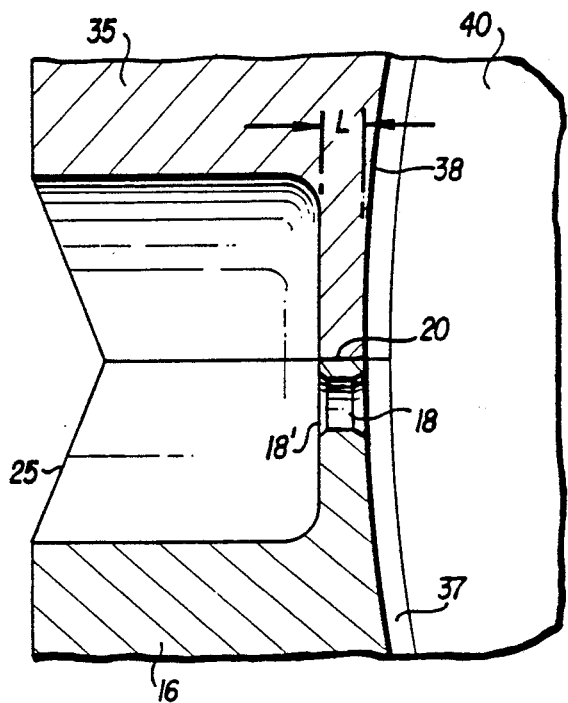
FIG. 3 is an enlarged sectional view taken along the lines 3—3 of FIG. 2.
Figure 4:
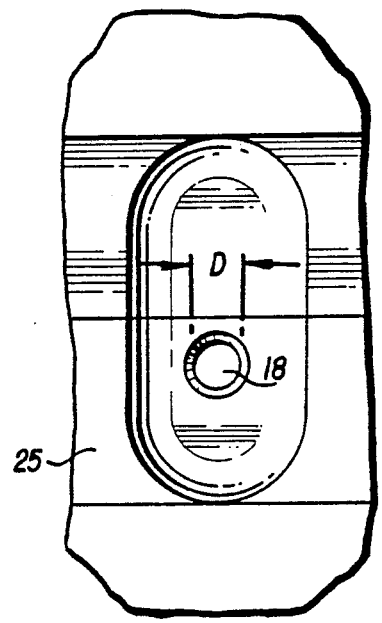
FIG. 4 is a side view of FIG. 3.

Referring to FIGS. 2–4, it can be seen that groove 25 meets with runner 15 and terminates in tunnel gate 18, which extends between groove 17 and the interior hemispherical surface 37 below the parting line 20 of the cavity.

FIG. 3 is an enlarged view of area 3—3 of FIG. 2 and illustrates tunnel gate 18 as it exists between hemispherical surface 37 and groove 25. In order to improve the breakaway process of the gate from the finished ball, tunnel gate 18 is countersunk, as shown, at 18'. It is to be appreciated that the illustration is exaggerated in the drawing for purposes of illustration. Each of the groove/tunnel gate arrangements are substantially identical.

Each of the eight gates shown, such as gate 18 of FIGS. 2–4, has a diameter, D, of between 0.010 and 0.060 inch, and preferably has a diameter of 0.030 inch.

These gates are equally spaced about the circumference of the hemispherical cavity and meet with the cavity surface and are vertically offset at a distance below parting line surface 20 between 0.010 and 0.060 inch, and preferably at a distance below the parting line surface of 0.030 inch. It should be noted that the gates may be located in the land area between the dimples or in the dimples themselves. For purposes of clarity, protuberances 39 are not shown in FIG. 3. While the size and number of gates are determined by the cover stock melt index, injection pressure, and fill time, there are at least three tunnel gates in each mold so as to ensure proper and equal filling of the mold.

In order to avoid the problem of injected material freezing off in the tunnel gates, the effective gate length is made as short as possible while still maintaining cavity integrity at the parting line. Additionally, the gates are preferably substantially parallel to parting line surface 20. The length, L, of the gates, such as gate 18, is preferably between 0.005 and 0.125 inch, and is preferably substantially 0.025 inch. This length is determined by cutting groove 25 in wall 16. The groove is preferably between 0.030 and 0.200 inch wide, 0.015 and 0.150 inch deep, and 0.060 and 0.175 inch long at the parting line surface so as to connect the tunnel gate to the mold runner system. Preferably the groove is substantially 0.125 inch wide by 0.125 inch deep and 0.150 inch long at the parting line surface. The gate is then cut between the groove and hemispherical surface 37.

In practice, solid core 40 is placed within one cavity and the other cavity is placed in a mating configuration. The core is supported by retractable pins 33, 34, 43, and 44 so as to provide the proper clearance between the core and the mold to give the desired cover depth. The positioning, including insertion and retraction, is performed by controls 61 and 63. The injected material is fed to the runner and fills the cavities about the core of the ball through the grooves and associated gates. At a fraction of a second before the injection fill time is complete, the pins are retracted (by means not shown) and the ball finishes filling. This ensures that the dimples created by the pins will be of substantially the same depth as those created by the protuberances on the hemispherical surfaces. It is normal practice that the heads of the pins be of the dimension of the protuberances so as to form dimples of substantially identical diameter in the ball cover, as indicated in FIG. 2.

In the sub-gated mold of the present invention, a pressure differential is created in the mold by injecting thermoplastic material into only the bottom mold half containing the gates. Accordingly, the pins which support the core and hold the core central during injection have been displaced to allow the centerline 42 of the core which runs through the geometrical center of the core to be positioned a slight distance below the mold parting line 20. With the above-given parameters for the specific mold, pins 33 and 34 and the associated pins in that section of the core extend into the mold a lesser distance from the spherical surface than do pins 43 and 44 and their associated pins in the half of the mold which does not have the sub-gates. Thus, as illustrated in FIG. 2, the distance L1 that pins 33 and 34 extend into the cavity is less than the distance L2 that pins 43 and 44 extend into the cavity. For the specific parameters discussed above, it has been determined that the offset of these pins must be such that the centerline 42 of the core is displaced 0.010 inch below the parting line 20 of the mold. This off-setting of the core pins compensates for the pressure differential by allowing the core to migrate to the center from a point below the mold centerline. While only three gates are required, the use of additional gates allows the effective cross-sectional area of the gate to be greatly reduced, resulting in much improved cosmetic quality of the molded part. For the same reason, a gate substantially parallel and near the parting line is preferred over an angular orientation due to the improved shearing action which takes place between the ball and the gate when the ball is ejected by a knockout pin action. With this use of the present invention, the runner, including the material in the gate, is stripped from the ball in one motion without leaving any gate vestige.

Figure 5:
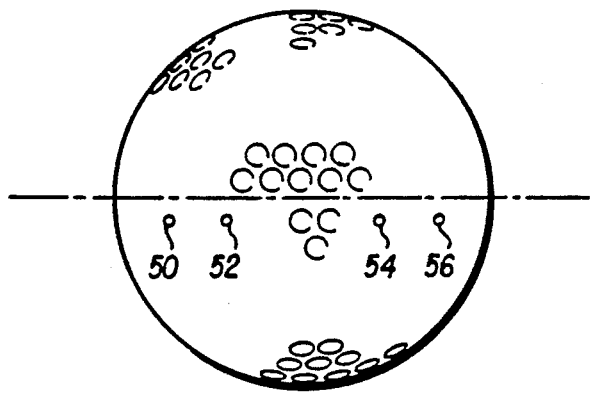
FIG. 5 is a schematic representation of a ball as it is removed from the mold of the present invention.

As mentioned above, in order to improve the cosmetics of the ball the parting line clearance was reduced to substantially zero, allowing the cavities to achieve full face-to-face contact, thus substantially eliminating any significant flash line at the parting line. After curing, the molds are separated and the pins in the lower section are moved inwardly so as to eject the ball from the lower mold. Due to the size, length, and location of the gate as discussed above, the material in the gates is pulled and sheared so as to leave no gate vestige on the ball. Additionally, the material in the gate remains attached to the material in the runner after the molding operation is completed. A schematic of such a ball as removed from the mold is shown in FIG. 5. The above-described removal process actually leaves small holes such as 50, 52, 54, and 56 in the surface of the ball. It is to be understood that the size of these holes are exaggerated in this showing in order to illustrate the resultant ball.

The above-described mold provides a process for substantially flashless injection-molding of golf balls which produces a product of good cosmetic quality while eliminating the need for post molding de-gating, trimming, or centerless grinding while maintaining consistent cover material distribution about the core and consistent product size without deviation from standard injection mold setup parameters or cycle times using conventional injection molding equipment.

It is to be understood that the above description and drawings are illustrative, only, since variations in the disclosed mold could be made without departing from the invention, the scope of which is to be limited only by the following claims.

We claim:

1. An injection mold for producing two-piece golf balls comprising
    a first cavity having a substantially hemispherical inner surface terminating in a parting line surface;
    a second cavity having a substantially hemispherical inner surface terminating in a parting surface, the inner surfaces and parting line surfaces of said cavities being substantially identical;
    plates for supporting and mating said cavities so as to form a substantially spherical inner surface ad mating parting line surfaces;
    a plurality of retractable pins in each of said cavities for supporting a core of a golf ball within said spherical inner surface when said cavities are mated, the axis of said pins being substantially perpendicular to said parting line surfaces;
    a runner in said plates extending about said parting line surfaces;
    a plurality of tunnel gates in said first cavity for interconnecting said runner to the hemispherical inner surface of said first cavity, said tunnel gates being vertically offset from said parting line surface of said front cavity; and means for locating said retractable pins so that the pins in said first cavity extend beyond the inner hemispherical surface a lesser distance than the pins in said second cavity extend beyond the inner hemispherical surface when said pins are in a position to support said core.

2. The injection mold of claim 1 wherein the length of each of said gates is preferably between 0.005 inch to 0.125 inch and the diameter of each of said gates is preferably between 0.010 inch and 0.060 inch.

3. The injection mold of claim 1 wherein the length of each of said gates is substantially 0.025 inch and the diameter of each of said gates is substantially 0.030 inch.

4. The injection mold of claim 1 wherein said tunnel gates are vertically offset from said parting line surface between 0.010 and 0.060 inch.

5. The injection mold of claim 1 wherein said tunnel gates are vertically offset from said parting line surface substantially 0.030 inch.

6. The injection mold of claim 1 wherein said gates are substantially parallel to said parting line surface of said first cavity.

* * * * *